United States Patent
Lee et al.

(10) Patent No.: US 11,176,078 B2
(45) Date of Patent: Nov. 16, 2021

(54) COMMUNICATION METHOD USING INPUT/OUTPUT INTERFACE, AND APPARATUS THEREFOR

(71) Applicant: Samsung Electronics Co., Ltd., Suwon-si (KR)

(72) Inventors: Woo Kwang Lee, Suwon-si (KR); Dong Rak Shin, Gwangju-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/645,644

(22) PCT Filed: Jul. 27, 2018

(86) PCT No.: PCT/KR2018/008499
§ 371 (c)(1),
(2) Date: Mar. 9, 2020

(87) PCT Pub. No.: WO2019/083135
PCT Pub. Date: May 2, 2019

(65) Prior Publication Data
US 2020/0265001 A1   Aug. 20, 2020

(30) Foreign Application Priority Data
Oct. 27, 2017   (KR) .................. 10-2017-0141499

(51) Int. Cl.
*G06F 13/40* (2006.01)
*G06F 13/42* (2006.01)
*G06F 1/3206* (2019.01)
*H02J 7/00* (2006.01)

(52) U.S. Cl.
CPC ........ *G06F 13/4068* (2013.01); *G06F 1/3206* (2013.01); *G06F 13/4282* (2013.01); *H02J 7/0042* (2013.01); *G06F 2213/0042* (2013.01)

(58) Field of Classification Search
None
See application file for complete search history.

(56) References Cited

U.S. PATENT DOCUMENTS 10,168,757 B2   1/2019   Shin et al.
10,211,652 B2   2/2019   Kwon et al.
10,298,028 B1 *   5/2019   Venkatasamy ........ H02J 7/0021
(Continued)

FOREIGN PATENT DOCUMENTS

| EP | 3 113 320 A1 | 1/2017 |
| KR | 10-2016-0149631 A | 12/2016 |
| KR | 10-2017-0040029 A | 4/2017 |

*Primary Examiner* — Henry Tsai
*Assistant Examiner* — Christopher A Bartels
(74) *Attorney, Agent, or Firm* — Jefferson IP Law, LLP

(57) ABSTRACT

An electronic device is disclosed. The electronic device comprises: a housing, an input/output interface, which includes a plurality of pogo pins exposed through a portion of the housing, and can be connected to an external device by a wire, an identification circuit, which is electrically connected to the input/output interface to identify the external device, a processor electrically connected to the identification circuit, and a booster electrically connected to the input/output interface to supply power to the external device. In addition, various embodiments understood from the specification are possible.

20 Claims, 9 Drawing Sheets

(56) References Cited

U.S. PATENT DOCUMENTS

| | | | |
|---|---|---|---|
| 2012/0123734 A1* | 5/2012 | Linde | G01R 31/2891 |
| | | | 702/150 |
| 2014/0111143 A1* | 4/2014 | Sells | H02J 7/0047 |
| | | | 320/107 |
| 2014/0133080 A1 | 5/2014 | Hwang et al. | |
| 2014/0201400 A1* | 7/2014 | Beel | H04L 12/1822 |
| | | | 710/63 |
| 2016/0091930 A1 | 3/2016 | Chen et al. | |
| 2016/0179738 A1* | 6/2016 | Guddeti | G06F 13/24 |
| | | | 714/56 |
| 2016/0203455 A1 | 7/2016 | Hicks et al. | |
| 2016/0345628 A1* | 12/2016 | Sabet | H04M 1/72527 |
| 2016/0373870 A1* | 12/2016 | Kang | H04R 1/1025 |
| 2017/0063107 A1* | 3/2017 | Lee | A61B 5/681 |
| 2017/0135771 A1* | 5/2017 | Auld | A61B 34/37 |
| 2017/0164089 A1* | 6/2017 | Lee | H04R 1/1025 |
| 2017/0177037 A1 | 6/2017 | Koo et al. | |
| 2017/0220088 A1* | 8/2017 | Tan | G06F 1/266 |
| 2017/0319132 A1* | 11/2017 | Longinotti-Buitoni | |
| | | | A61B 5/0205 |
| 2018/0123367 A1* | 5/2018 | Higgins | H02J 7/0027 |
| 2018/0145745 A1* | 5/2018 | Sachs | H04B 7/26 |
| 2018/0197433 A1* | 7/2018 | Tavares | G06F 3/03547 |
| 2018/0279429 A1* | 9/2018 | Sadwick | F21K 9/27 |
| 2018/0317826 A1* | 11/2018 | Muhsin | G16H 40/67 |
| 2019/0175068 A1* | 6/2019 | Everdell | A61B 5/1032 |
| 2019/0176837 A1* | 6/2019 | Williams | B60W 50/02 |
| 2020/0084533 A1* | 3/2020 | Hankey | H04R 1/105 |
| 2020/0169101 A1* | 5/2020 | Li | H02J 7/0045 |

* cited by examiner

COMMUNICATION METHOD USING INPUT/OUTPUT INTERFACE, AND APPARATUS THEREFOR

TECHNICAL FIELD

Embodiments disclosed herein relate to a communication technology using an input/output interface.

BACKGROUND ART

An electronic device, such as a smartphone and a tablet PC, includes a wired input/output interface for connecting to external devices. The wired input/output interface is generally exposed to a part of the external surface of the electronic device to couple with a cable or other accessories. The electronic device may perform battery charging and/or wired communication in such a manner that the wired input/output interface is physically connected to a cable or other accessories having a plug.

The wired input/output interface may comply with various standards, for example, a universal serial bus (USB), a high definition multimedia interface (HDMI), a reduced standard-232 (RS-232), a plain old telephone service (POTS), and an inter integrated circuit (I2C) or universal asynchronous receiver/transmitter (UART).

The input/output interface for high speed communication, such as USB may include, for example, a USB connector. The input/output interface for low speed communication, such as I2C or UART, may be, for example, a POGO pin.

DISCLOSURE

Technical Problem

An input/output interface sensitive to the external environment, such as a pogo pin, has various problems such as early corrosion occurrence. In the case of a communication method such as I2C, it may be difficult to solve the corrosion problem due to limitations in using current. In addition, when using a communication method such as USB, even though the corrosion problem of a device is solved, there is a problem that current consumption increases.

Hereinafter, various embodiments disclosed in the present disclosure provide a method and apparatus for performing wired communication through an input/output interface including a pogo pin.

Technical Solution

According to an embodiment disclosed herein, an electronic device may include a housing, an input/output interface including a plurality of pogo pins exposed through a portion of the housing and connectable to an external device in a wired manner, an identification circuit electrically connected to the input/output interface to identify the external device, a processor electrically connected to the identification circuit, and a booster electrically connected to the input/output interface to supply power to the external device. The plurality of pogo pins may include at least one first pin for data communication with the external device, a second pin electrically connected to the identification circuit to transfer an ID of the electronic device, a third pin electrically connected to the booster, and a fourth pin electrically connected to a ground of the electronic device.

Furthermore, according to an embodiment disclosed herein, an electronic device may include a housing, a standard type of first user serial bus (USB) input/output interface exposed through a first portion of the housing, a non-standard type of second USB input/output interface including a plurality of pogo pins exposed through a second portion of the housing, a selection circuit that selects the first input/output interface or the second input/output interface, an identification circuit electrically connected to the selection circuit to identify an external device, a processor electrically connected to the identification circuit, at least one charger electrically connected to at least one of the first input/output interface or the second input/output interface, and a battery electrically connected to the charger. The plurality of pogo pins may include at least one first pin electrically connected to the selection circuit to communicate data with the external device, a second pin electrically connected to the identification circuit by bypassing the selection circuit, a third pin electrically connected to the battery, and a fourth pin electrically connected to a ground of the electronic device.

Advantageous Effects

According to the embodiments disclosed herein, it is possible to prevent corrosion of the input/output interface.

According to the embodiments disclosed herein, it is possible to reduce current consumption due to communication using the input/output interface.

In addition, various effects may be provided that are directly or indirectly understood through the disclosure.

DESCRIPTION OF DRAWINGS

In the description of the drawings, the same or similar reference numerals may be used for the same or similar components.

MODE FOR INVENTION

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Figure 1:
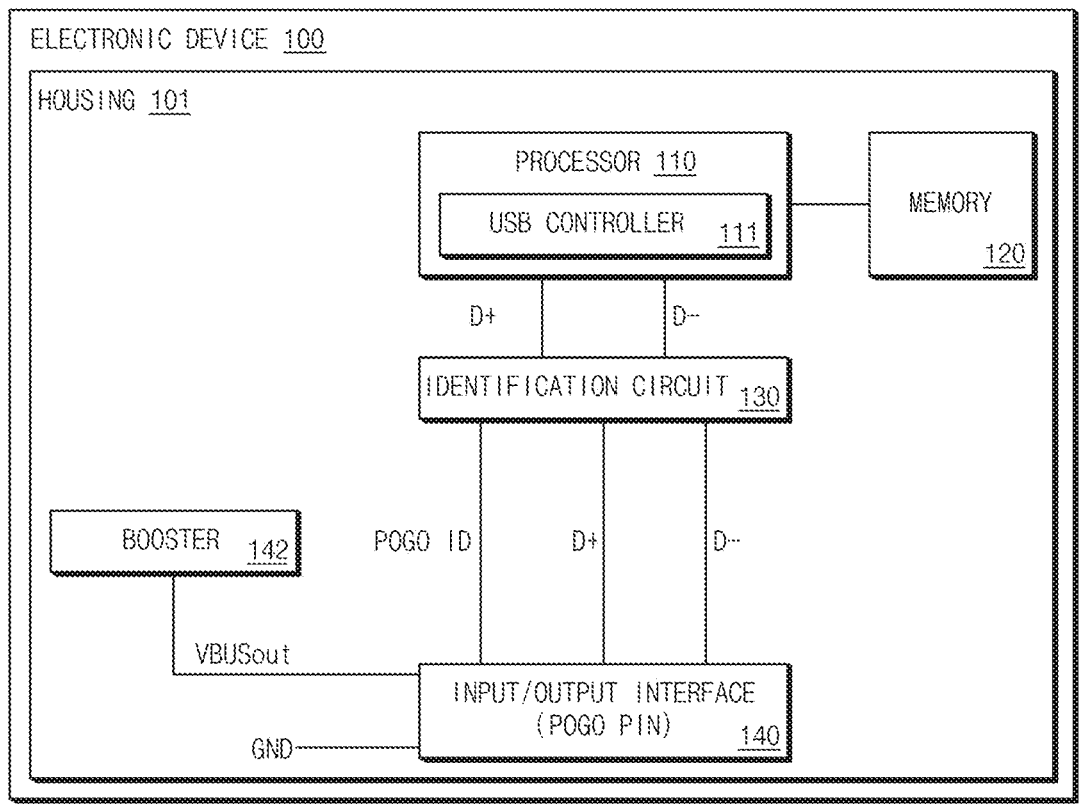
FIG. 1 is a block configuration diagram of an electronic device including a user interface according to an embodiment.

FIG. 1 is a block configuration diagram of an electronic device including a user interface according to an embodiment.

According to an embodiment, an electronic device 100 may include a housing 101 for protecting components of the electronic device 100 and forming an outer surface thereof. According to an embodiment, the electronic device 100 may include a processor 110, a memory 120, or an input/output interface 140 inside the housing 101. According to various embodiments, some of the above components of the electronic device 100 may be omitted or other components may be additionally included. For example, a component such as a display, a camera, or a battery may be additionally included in the electronic device 100. The display may be exposed through a portion of the housing 101.

According to an embodiment, the processor 110 may perform operations according to various embodiments disclosed herein. For example, the processor 110 may recognize an external device through the input/output interface 140, perform a communication connection with the external device or perform data communication associated with an application program with the external device through the input/output interface 140. The processor 110 may be electrically or operatively connected to the memory 120, an identification circuit 130, the input/output interface 140 or a booster 142. The processor 110 may execute instructions stored in the memory 120.

According to an embodiment, the processor 110 may perform an operation specified in the USB specification. For example, the processor 110 may include a USB controller 111. The USB controller 111 may support an operation compliant with the USB specification. For example, the USB controller 111 may generate a signal according to the USB specification. According to an embodiment, the USB controller 111 may perform a USB host function. The USB controller 111 may determine a USB role of the electronic device 100. For example, the USB controller 111 may determine whether the electronic device 100 is a sink device or a source device. Alternatively, the USB controller 111 may determine whether the electronic device 100 is a host device or a client device. According to an embodiment, the USB controller 111 may be electrically connected to a non-standard type of USB interface.

According to an embodiment, the processor 110 may perform an operation disclosed herein or control other components for performing a relevant operation. For example, the processor 110 may turn on or turn off a component in the electronic device 100. The turn-on may include activating the component or activating at least some functions of the component. The turn-off may include deactivating the component or deactivating at least some functions of the component. For example, an operation in which the processor 110 turns on the booster 142 may be understood as activating or turning on a VBUS function of the booster 142. For example, an operation of turning on a charger (e.g., a second charger 180 of FIG. 2) by the processor 110 may be understood as turning on a booster function of the charger. For example, an operation of turning on the USB host by the processor 110 may be understood as activating or turning on a host function or host function block of the USB controller 111. According to an embodiment, the memory 120 may store at least one application or data related to the operation of the electronic device 100. According to various embodiments, the memory 120 may include instructions regarding various operations disclosed herein. The instructions may be executed by the processor 110.

According to an embodiment, the input/output interface 140 may be a non-standard type of USB interface. According to an embodiment, the input/output interface 140 may include a plurality of pogo pins. The non-standard type of USB input/output interface 140 may refer to an interface of a type not defined in the USB specification. However, signals according to the USB specification may be exchanged through the non-standard type of USB interface. The pin may also be referred to as a terminal. According to an embodiment, the input/output interface 140 may be a connector. The connector may be connected to a connector of an external device directly or through a separate cable.

According to an embodiment, the input/output interface 140 may transfer a power signal or a data signal between the external device and the electronic device 100. When connected to the external device, the input/output interface 140 may include at least one pin for transmitting and receiving power or data. At least one pin included in the input/output interface 140 may form a contact that be in contact with at least one pin included in an input/output interface of the external device to transmit and receive data.

According to various embodiments, the input/output interface 140 may include a plurality of pogo pins. For example, the input/output interface 140 may include a data pin, an identification pin, a ground pin, or a power pin.

At least one data pin may be included for data communication with the external device. For example, the data pin may include a D+ pin and a D− pin. The at least one data pin may be electrically or operatively connected to the processor 110 or the identification circuit 130.

The input/output interface 140 may include an identification pin (ID pin) electrically connected to the identification circuit 130. The identification pin may transmit an identification (ID) of the external device to the identification circuit 130. The ID of the external device may correspond to a pogo ID.

According to one embodiment, the identification pin may be connected to an identification pin of the identification circuit 130. According to an embodiment, the identification circuit 130 may obtain the ID of the external device through the identification pin.

The input/output interface 140 may include a ground pin. The input/output interface 140 may be connected to the ground of the electronic device 100 through the ground pin.

The input/output interface 140 may include a power pin. The power pin may be a pin for transmitting and receiving a signal required to perform a function such as device recognition or device connection detection. The power pin may be a VBUS pin for supplying or receiving VBUS. The power pin may include a pin for receiving VBUS (hereinafter, referred to as a VBUS in pin) or a pin for supplying VBUS (hereinafter, referred to as a VBUS out pin). The VBUS in pin may also be referred to as a power receive pin. The VBUS out pin may also be referred to as a power supply pin. According to an embodiment, the power pin may be electrically connected to the booster 142. In the following embodiments, the booster 142 may be referred to as a pogo booster.

According to an embodiment, the booster 142 may supply power to an external device through the input/output interface 140. The power supplied to the external device may be referred to as VBUS out. When a resistance value is acquired by the identification circuit 130, the identification circuit 130 or the processor 110 may allow the booster 142 to supply power to the external device. The booster 142 may be connected to a pogo pin and may be referred to as a pogo booster. A booster, which is connected to a pin compliant with the USB specification, may be referred to as a VBUS booster or a USB booster. According to an embodiment, the booster 142 may be a battery and may be connected to a charger.

According to an embodiment, the identification circuit 130 may be disposed between the processor 110 and the input/output interface 140. The identification circuit 130 may be electrically connected to the data pin and the identification pin of the input/output interface 140.

According to an embodiment, the identification circuit 130 may acquire an ID from the identification pin. For example, the ID may be a Pogo ID or an analog to digital converter (ADC) value. When the identification circuit 130 reads out an ADC value and detects a specific device based on the ADC value, the identification circuit 130 may perform a necessary operation. For example, the identification circuit 130 may read out the ADC value and transfer the ADC value to the processor 110, and the processor 110 may detect a specific device based on the ADC value received through an identification circuit driver (not shown). Accordingly, the processor 110 may activate the USB controller 111 or activate the USB host function.

According to an embodiment, when the identification circuit 130 detects a specific device, the electronic device 100 may activate the booster 142. For example, when the specific device is detected through the identification circuit 130, the processor 110 or the identification circuit 130 may turn on at least some functions of the booster 142. The ADC or pogo ID may correspond to a resistance value of an external device. The resistance value of the external device may have a value of zero or more.

According to an embodiment, as shown in FIG. 1, the identification circuit 130 may be separate from the processor 110, but may be included in the processor 110. According to an embodiment, the identification circuit 130 may include a micro USB interface controller.

According to an embodiment, the identification circuit 130 may control other components disclosed herein. In the description with reference to FIG. 1, the identification circuit 130 has been described as a separate component from the processor 110, but the identification circuit 130 may be implemented by the processor 110. In the following descriptions, the identification circuit 130 may be a program (e.g., identification circuit driver) running on the processor 110.

According to an embodiment, an electronic device may include a housing, an input/output interface including a plurality of pogo pins exposed through a portion of the housing and connectable to an external device in a wired manner, an identification circuit electrically connected to the input/output interface to identify the external device, a processor electrically connected to the identification circuit, and a booster electrically connected to the input/output interface to supply power to the external device.

According to an embodiment, wherein the plurality of pogo pins may include at least one first pin for data communication with the external device, a second pin electrically connected to the identification circuit to transfer an ID of the electronic device, a third pin electrically connected to the booster, and a fourth pin electrically connected to a ground of the electronic device.

According to an embodiment, the electronic device may further include a user serial bus (USB) controller. The input/output interface may be electrically connected to the USB controller According to an embodiment, the processor or the identification circuit may trigger communication connection with the external device based at least on the second pin.

According to an embodiment, the identification circuit may allow the booster to supply power through the third pin when acquiring an ID of the external device through the second pin.

According to an embodiment, the processor may monitor data communicated through the at least one first pin for a predetermined time interval, and stop an operation of supplying the power when the data is not communicated within the predetermined time interval. According to an embodiment, the predetermined time interval may be a time interval after the ID of the external device is acquired. According to an embodiment, the predetermined time interval may be a predetermined time interval from a time point at which the power starts to be supplied.

According to an embodiment, the ID may have a resistance value.

According to an embodiment, the identification circuit may detect a change in an ID of the external device while communicating data with the external device.

According to an embodiment, the processor or the identification circuit may stop communication of the data in response to the change in the ID.

According to an embodiment, the processor or the identification circuit may allow the booster to stop an operation of supplying power in response to the change of the ID.

According to an embodiment, the electronic device may further include at least one charger electrically connected to the input/output interface, and a battery electrically connected to the charger.

According to an embodiment, the input/output interface may further include a fifth pin electrically connected to a charger, and acquire power from the external device through the fifth pin.

According to an embodiment, the input/output interface may support a travel adapter (TA).

Figure 2:
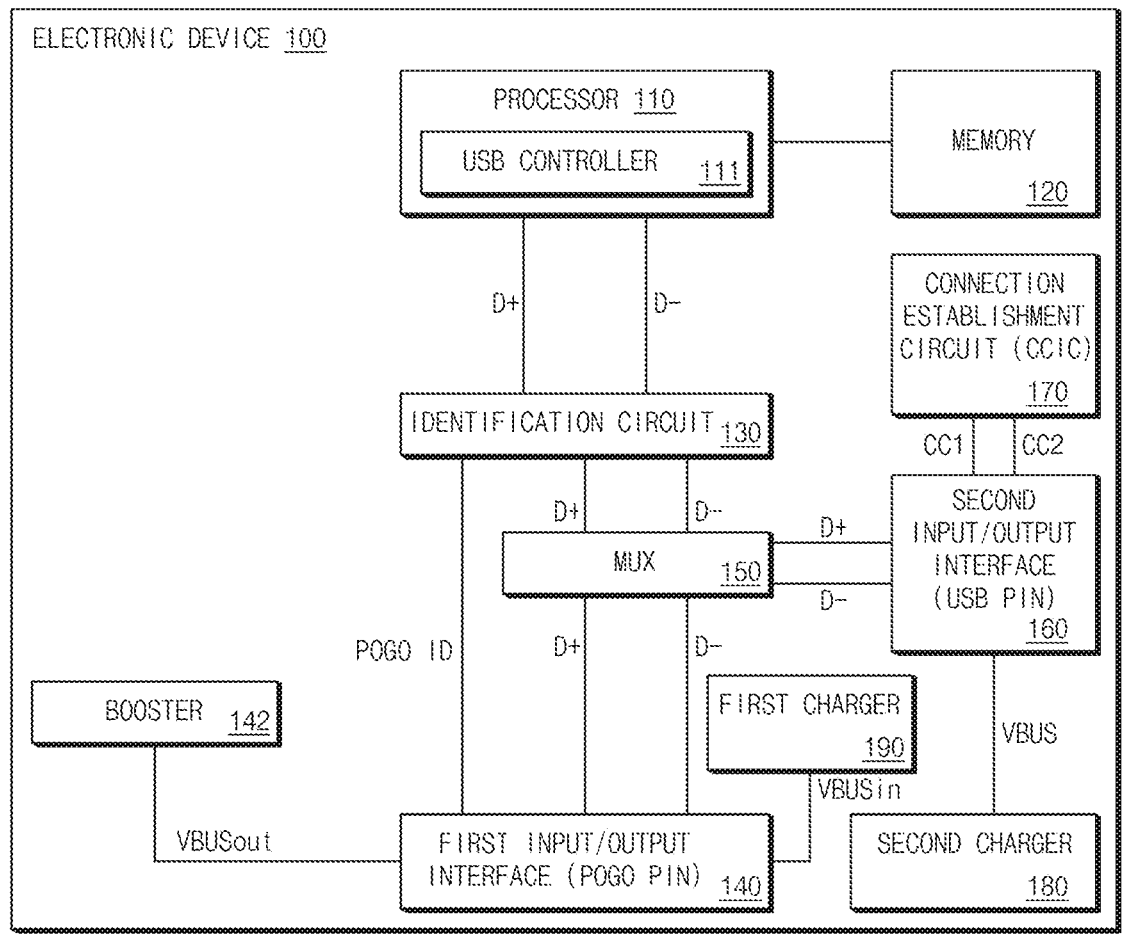
FIG. 2 is a block configuration diagram illustrating an electronic device according to an embodiment.

FIG. 2 is a block configuration diagram illustrating an electronic device according to an embodiment.

According to an embodiment, the electronic device 100 may include the processor 110, the memory 120, the identification circuit 130, a first input/output interface 140, the booster 142, a multiplexer (MUX) 150, a second input/output interface 160, a connection establishment circuit 170, a first charger 190, or the second charger 180. Here, the configurations of the same reference numerals as those used in FIG. 1 may be the same as or similar to the corresponding configurations of FIG. 1. For example, the first input/output interface 140 of FIG. 2 may be the same as or similar to the input/output interface 140 of FIG. 1.

According to an embodiment, the electronic device 100 may include an additional input/output interface 160. The additional input/output interface 160 may refer to the second input/output interface 160.

According to an embodiment, the processor 110 may further perform an operation associated with the second input/output interface 160. The USB controller 111 may perform an operation associated with the second input/output interface 160. For example, the USB controller 111 may be a USB controller that performs operations specified in the USB specification. The processor 110 may exchange signals or data with an external device through the second input/output interface 160 and process the signals or data. According to an embodiment, the processor 110 may communicate data through one of the first input/output interface 140 or the second input/output interface 160 at the same time. The USB controller 111 may generate a signal associated with the first input/output interface 140 and/or generate a signal associated with the second input/output interface 160.

Although the identification circuit 130 is illustrated as being positioned between the processor 110 and the multiplexer 150 in FIG. 2, the processor 110 may be disposed between the identification circuit 130 and the multiplexer 150.

According to an embodiment, the electronic device 100 may include a selection circuit for selectively connecting to the first input/output interface 140 or the second input/output interface 160. The selection circuit may include, for example, the multiplexer 150. In the following description, the selection circuit is the multiplexer 150 by way of example.

According to an embodiment, a path between the multiplexer 150 and the first input/output interface 140 may be referred to as a first data path, and a path between the multiplexer 150 and the second input/output interface 160 may be referred to as a second data path. The multiplexer 150 may perform path switching between the first data path and the second data path. The multiplexer 150 may perform a selective connection to the first input/output interface 140 or the second input/output interface 160 of the processor 110. The first data path may be referred to as a pogo path, and the second data path may be referred to as a USB path.

According to an embodiment, the multiplexer 150 may be arranged between the processor 110 (or the identification circuit 130) and the input/output interfaces 140 and 160 and may electrically connect one of the input/output interfaces 140 and 160 and the processor 110 (or the identification circuit 130). According to an embodiment, the multiplexer 150 may not provide a data communication connection between the second input/output interface 160 and the processor 110 while being connected to the first input/output interface 140.

According to an embodiment, the identification circuit 130 may control the data paths between the multiplexer 150 and the input/output interfaces 140 and 160. The identification circuit 130 may control the multiplexer 150 such that the processor 110 is connected to the first data path or the second data path.

According to an embodiment, when the identification circuit 130 reads out the ADC value and detects a specific external device based on the ADC value as mentioned with reference to FIG. 1, the identification circuit 130 may perform an operation required for the corresponding device. For example, the identification circuit 130 may turn on the USB controller 111 or turn on the USB host function. The identification circuit 130 may transfer the ADC value to the processor 110 to turn on the USB controller 111. The identification circuit 130 may switch a data path of the multiplexer 150.

According to an embodiment, the first data path may take precedence over the second data path. Accordingly, when an external device is connected to the second input/output interface 160 and is also connected to the first input/output interface 140 even while data is transmitted and received through the first data path, the data path is switched to the first data path.

According to an embodiment, when the identification circuit 130 acquires an ID of the external device through the first input/output interface 140, the electronic device 100 (e.g., the processor 110 or the identification circuit 130) may set the data path to the first data path. For example, the identification circuit 130 may acquire the ID of the external device through an identification pin of the first input/output interface 140.

According to an embodiment, the second input/output interface 160 may be a USB input/output interface compliant with the USB specification. In other words, the second input/output interface 160 may be a standard type of USB input/output interface. For example, the second input/output interface 160 may be a Type-C USB connector, which is defined in the USB specification. The second input/output interface 160 may be directly connected to a connector of the external device, or may be connected to the external device through a separate cable. For example, the second input/output interface 160 may be connected to the external device through an on-the-go (OTG) connector or a USB cable.

According to an embodiment, the second input/output interface 160 may include at least one recognition pin to recognize the external device. The recognition pin may be, for example, a configuration channel (CC) pin. In other words, the second input/output interface 160 may include at least one CC pin. For example, the at least one CC pin may include a CC1 pin and a CC2 pin. According to an embodiment, the CC pin may be electrically connected to the connection establishment circuit 170.

According to an embodiment, the second input/output interface 160 may include at least one data pin. The at least one data pin may be electrically or operatively connected to the processor 110 or the identification circuit 130. The electronic device 100 may perform data communication with the external device through the data pin. The data pin may be a D+ or D− pin.

According to an embodiment, the second input/output interface 160 may include a power pin. The power pin may be, for example, a VBUS pin. The power pin may be electrically connected to the second charger 180. The electronic device 100 may supply power to the second input/output interface 160 and/or the external device or receive power from the external device, through the power pin. In addition, the second input/output interface 160 may include various pins compliant with the USB communication specification.

According to an embodiment, the connection establishment circuit 170 may control an operation associated with the second input/output interface 160. According to an embodiment, the connection establishment circuit 170 may be manufactured as a chip separate from the processor 110 or included in the processor 110. The connection establishment circuit 170 may be connected to the CC pin included in the second input/output interface 160. The connection establishment circuit 170 may control an operation associated with the second input/output interface 160 or perform CC communication with an external device through CC communication. The connection establishment circuit 170 may perform an operation related to power supply or power reception to or from the external device. The connection establishment circuit 170 may recognize information (e.g., information acquired through CC communication) of the electronic device connected to the second input/output interface 160 and determine a power source to be transferred to the second input/output interface 160 or identify the connection with the external device. According to an embodiment, the connection establishment circuit 170 may perform an operation specified in the USB specification. In detail, the connection establishment circuit 170 may transmit information of the connected electronic device to the processor 110, and a program running on the processor 110 (e.g., a driver of the connection establishment circuit) may determine power to be transferred to the second input/output interface 160 or identify the connection with the external device.

The connection establishment circuit 170 may include a power delivery integrated circuit (PDIC) and/or a configuration channel integrated circuit (CCIC). In the following description, the connection establishment circuit 170 may be referred to as the CCIC 170.

According to an embodiment, the electronic device 100 may include at least one charger 180 or 190 and/or a battery (not shown) to receive or supply power. For example, the electronic device 100 may include the first charger 190 associated with the first input/output interface 140 and the second charger 180 associated with the second input/output interface 160.

According to an embodiment, the second input/output interface 160 may be electrically connected to the second charger 180. The power pin of the second input/output interface 160 may be connected to the second charger 180. The electronic device 100 may supply power to the second input/output interface 160 and/or an external device connected to the second input/output interface 160 through the power pin. The charger 180 may perform the function of a booster. For example, the charger 180 may supply VBUS power. In addition, the charger 180 may perform various operations described herein. For example, the second charger 180 may provide or receive a VBUS when connecting a travel adapter (TA) or an on-the-go (OTG) connector to the second input/output interface 160. The power pin may be, for example, a VBUS pin. Hereinafter, the charger 180 may be referred to as a VBUS booster.

According to an embodiment, the first input/output interface 140 may be electrically connected to the first charger 190. The power pin of the first input/output interface 140 may be connected to the first charger 190. The power pin may be, for example, a VBUS out pin. The VBUS out pin may also be referred to as a power supply pin. The electronic device 100 may acquire a charging current from an external device connected to the first input/output interface 140 through the power pin. The first charger 190 may be a wireless power consortium (WPC) charger. The WPC charger may be used to charge the electronic device when TA is connected to a device supporting a pogo pin. The first input/output interface 140 may include a TA pin for TA connection separately in addition to the VBUS in and VBUS out pins.

Although FIG. 2 illustrates the first charger 190 and the second charger 180, the electronic device 100 may include one charger connected to the first input/output interface 140 or the second input/output interface 160.

Although not shown in FIG. 2, the electronic device 100 may further include at least one battery. The battery may be connected to at least one of the first charger 190 or the second charger 180. The battery may supply power to an external electronic device. For example, the battery may be electrically connected to the booster 142.

According to an embodiment, an electronic device may include a housing, a standard type of first user serial bus (USB) input/output interface exposed through a first portion of the housing, a non-standard type of second USB input/output interface including a plurality of pogo pins exposed through a second portion of the housing, a selection circuit that selects the first input/output interface or the second input/output interface, an identification circuit electrically connected to the selection circuit to identify an external device, a processor electrically connected to the identification circuit, at least one charger electrically connected to at least one of the first input/output interface or the second input/output interface, and a battery electrically connected to the charger. The plurality of pogo pins may include at least one first pin electrically connected to the selection circuit to communicate data with the external device, a second pin electrically connected to the identification circuit by bypassing the selection circuit, a third pin electrically connected to the battery, and a fourth pin electrically connected to a ground of the electronic device.

According to an embodiment, the plurality of pogo pins may further include a fifth pin electrically connected to the charger.

According to an embodiment, the processor may provide power to the external device through the fourth pin or acquire power from the external device through the fifth pin when the external device is connected to the second input/output interface.

According to an embodiment, the selection circuit may include a multiplexer.

According to an embodiment, the processor or the identification circuit may allow the multiplexer to communicate data between the multiplexer and the second input/output interface and not to communicate data between the multiplexer and the first input/output interface, when the external device is connected to the first input/output interface and another external device is connected to the second input/output interface.

According to an embodiment, the electronic device may further include a user serial bus (USB) controller. According to an embodiment, the USB controller may generate a signal at least associated with the second input/output interface. The USB controller may generate a signal associated with the first input/output interface.

Figure 3:
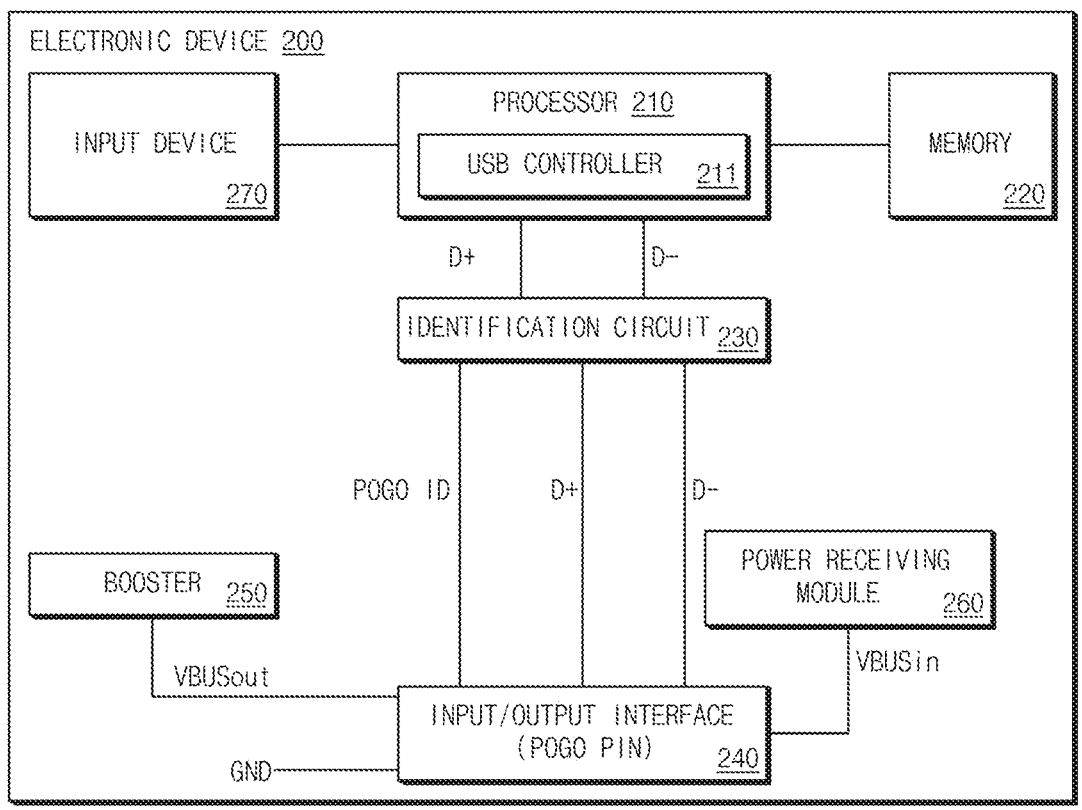
FIG. 3 is a block configuration diagram illustrating an electronic device according to an embodiment.

FIG. 3 is a block configuration diagram illustrating an electronic device according to an embodiment.

An electronic device 200 of FIG. 3 may represent a configuration of an electronic device that is able to be connected to the electronic device 100 of FIG. 1 or 2. The electronic device 200 may be an external device from the viewpoint of the electronic device 100. In the following description, the external device of the electronic device 200 may be the electronic device 100. The electronic device 200 may be wiredly connected to the electronic device 100 through an input/output interface including a pogo pin (e.g., the input/output interface 140 of FIG. 1). In this case, the electronic device 200 may be referred to as a pogo USB device.

The electronic device 200 may include a processor 210, a memory 220, an identification circuit 230, an input/output interface 240, a USB controller 211 (e.g., a USB device controller), a booster 250, a power receiving module 260 or an input device 270. The booster 250 may be referred to as a power supply module 250. According to various embodiments, some of the above components of the electronic device 200 may be omitted or other components may be additionally included. Some components of the electronic device 200 may be the same as or similar to some components of the electronic device 100 of FIG. 1. For example, the description of the processor 110, the memory 120, the identification circuit 130, and the input/output interface 140 or the booster 142 may be referred to for the processor 210, the memory 220, the identification circuit 230, the input/output interface 240, and the booster 250 of FIG. 1.

According to an embodiment, the electronic device 200 may perform operations specified in the USB specification. For example, the electronic device 200 may include the USB controller 211. According to an embodiment, the USB controller 211 may perform a USB device function. The USB controller 211 may be electrically connected to the input/output interface 240. Although the USB controller 211 is illustrated as being implemented on the same chip as the processor 210 in FIG. 3, the USB controller 211 may be implemented as a separate chip. According to an embodiment, the electronic device 200 may include the input device 270. For example, the electronic device 200 may include a keyboard. The electronic device 200 may transfer an input signal acquired through the input device 270 to an external device (e.g., the electronic device 100 of FIG. 1) through the input/output interface 240.

According to an embodiment, the electronic device 200 may include the booster 250 (or the power supply module 250). The booster 250 may provide a VBUS to the external device 100 or supply charging power to the external device 100.

According to an embodiment, the electronic device 200 may include the power receiving module 260. The power receiving module 260 may receive power from the external device through the input/output interface 240. The power receiving module 260 may be electrically connected to a VBUS in pin, for example. Alternatively, the power receiving module 260 may be connected to a TA pin and may receive power through TA connection.

According to an embodiment, the power receiving module 260 may distribute and supply power to an internal component such as the processor 210. According to an embodiment, the power receiving module 260 may be connected to a battery (not shown) to charge the battery.

According to an embodiment, the processor 210 or the identification circuit 230 may change an ID (e.g., a resistance) associated with the input/output interface 240 of the electronic device 200. The ID may be a pogo ID (or a resistance ID). For example, the processor 210 or the identification circuit 230 may change an ADC value. The electronic device 200 may include at least a first resistor and a second resistor to set the resistance ID. The processor 210 may connect one of the first resistor and the second resistor to an identification pin and change a resistance ID of the identification pin.

Figure 4:
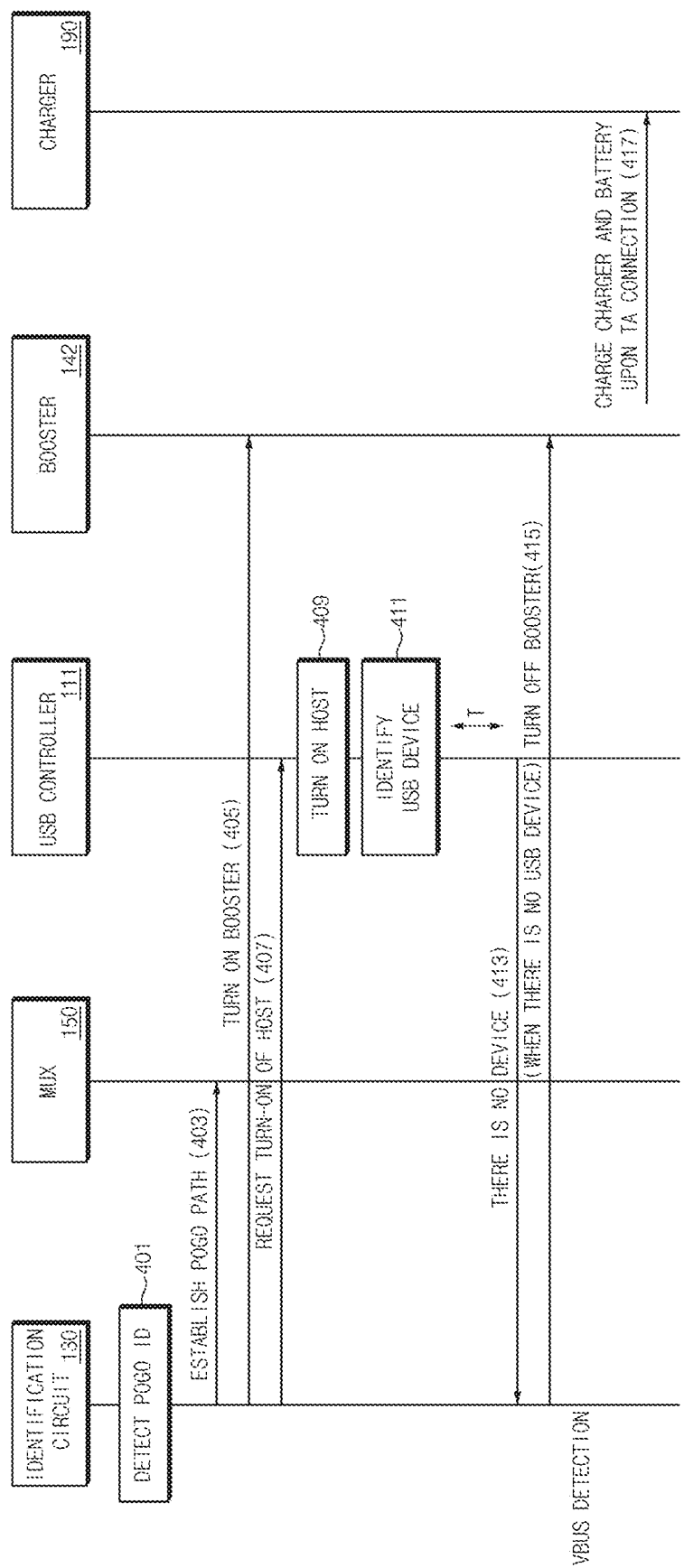
FIG. 4 is a flowchart of a connection method between an electronic device and an external electronic device according to an embodiment.

FIG. 4 is a flowchart of a connection method between an electronic device and an external electronic device according to an embodiment.

Operations shown in FIG. 4 may be performed by an electronic device (e.g., the electronic device 100 of FIG. 1). At least some of the operations may be performed by a processor (e.g., the processor 110 of FIG. 1 or 2) and stored in a memory in the form of instructions. For example, the matters described as the operations of the identification circuit 130 and the USB controller 111 may be performed in a program (e.g., a circuit driver) included in the processor or the memory.

According to an embodiment, the electronic device may recognize a connection with an external device (e.g., the electronic device 200 of FIG. 3) through two phases to prevent corrosion of an input/output interface. Even when the electronic device (e.g., the electronic device 100 of FIG. 1) recognizes an external device through an ADC value, the ADC value may be misrecognized due to a foreign material or the like. The electronic device may perform additional identification for connection of the external device for the waterproofing or corrosion protection of the pogo pins or for reducing unnecessary waste of power.

In operation 401, the electronic device (e.g., the identification circuit 130 of FIG. 1 or FIG. 2) may recognize an ID of the external device. For example, the ID of the external device may be a pogo ID. The pogo ID may correspond to a resistance value in the input/output interface 140 (e.g., the input/output interface 140 of FIG. 1 or 2).

In operation 403, the electronic device (e.g., the processor or the identification circuit 130) may establish a data path in response to the recognition of the ID. For example, when the electronic device recognizes the ID through the identification circuit 130 while the multiplexer 150 (e.g., the multiplexer 150 of FIG. 2) is connected to a second data path (or a USB path), the electronic device may perform control such that the multiplexer 150 is connected to the first data path (or a pogo path). In this case, the second data path may be a default path. The multiplexer 150 may switch a data path from a data pin of the second input/output interface 160 (e.g., the second input/output interface 160 of FIG. 2) to a data pin of the first input/output interface 140 (e.g., the first input/output interface 140 of FIG. 1 or 2) according to the control of the processor.

In operation 405, the electronic device (e.g., the processor and/or the identification circuit 130) may turn on the booster 142 (e.g., the booster 142 of FIG. 1 or FIG. 2). Here, the turn-on of the booster 142 may be understood as activating the supply of a VBUS. The electronic device may provide power to an external electronic device through the VBUS pin of the first input/output interface 140 by controlling the booster 142. Operation 405 may be performed concurrently with operation 403 or earlier than operation 403. This operation may be referred to as turning on the pogo booster.

In operation 407, the electronic device (e.g., the identification circuit 130 or the processor) may request to turn on a USB host operation. For example, it is possible to request the identification circuit 130 or the USB controller 111 to turn on the USB host operation. For example, the identification circuit 130 may transmit a host turn-on request message to the processor or the USB controller 111.

In operation 409, in response to the host turn-on request message, the electronic device (e.g., the processor or the USB controller 111) may turn on a host function. The USB controller 111 may turn on a host function. The processor may perform control such that the USB controller 111 turns on the host function. The USB controller 111 may include a host block that performs the host function.

In operation 411, the electronic device (e.g., the processor 110 or the USB controller 111) may identify an external device. The electronic device may additionally determine whether the external device is recognized through an input/output interface including a pogo pin. For example, the processor 110 or the USB controller 111 may trigger a USB enumeration procedure. The electronic device may initiate USB communication by recognizing an external USB device through the USB enumeration procedure and activating a relevant function (e.g., a USB class function). The electronic device may determine whether the external device is recognized after the elapse of a predetermined time from a specific time point. For example, it may be determined whether the external device is recognized within 3 seconds after the VBUS is turned on. When the external device is not recognized even after the elapse of the predetermined time, the electronic device may control the booster 142 to turn off a power source provided to the external electronic device. For example, the VBUS of the booster 142 may be turned off.

According to an embodiment, when the booster 142 supplies VBUS power, the external device (e.g., the electronic device 200 of FIG. 3) may start to be driven with a received power. When the USB controller of the external device (e.g., the USB controller 211 of FIG. 3) pulls up a signal line of a data pin (e.g., a D+ pin), the USB controller 111 of the electronic device 100 may detect that the data pin is pulled up and initiate the USB enumeration procedure to recognize a USB device.

The recognition of the external device may correspond to the recognition of the USB device from the viewpoint of the electronic device. When the external device is recognized as a USB device, the electronic device may operate as a USB host.

In operation 413, when the external device is not recognized within a predetermined time from a specific time point, the electronic device (e.g., the USB controller 111 or the processor 110) may determine that the external device does not exist after the elapse of the predetermined time. The electronic device may transmit a message indicating that there is no external device to the identification circuit 130. For example, the USB controller 111 may monitor data communicated through a data pin during the predetermined time. When the data is not communicated during the interval of the predetermined time, the USB controller 111 may determine that there is no external device. Alternatively, the above operation may be performed by the processor 110 or a USB controller driver operating in the processor 110.

In operation 415, the electronic device (e.g., the processor 110 or the USB controller 111) may determine that there is no external device and stop supplying power. This operation may be referred to as an operation of turning off the booster 142. To prevent corrosion of the pogo pin, the electronic device may deactivate the VBUS of the booster 142.

When it is recognized that there is an external device, the electronic device may perform connection with the external device.

In operation 417, when an external device TA is connected, the electronic device may acquire a charging current through the charger 190. The electronic device may receive the charging current through the charger 190 and charge a battery. The electronic device may acquire a charging current through the power pin (VBUS in pin) of the input/output interface. The electronic device may perform data communication with the external device while charging the battery.

Figure 5:
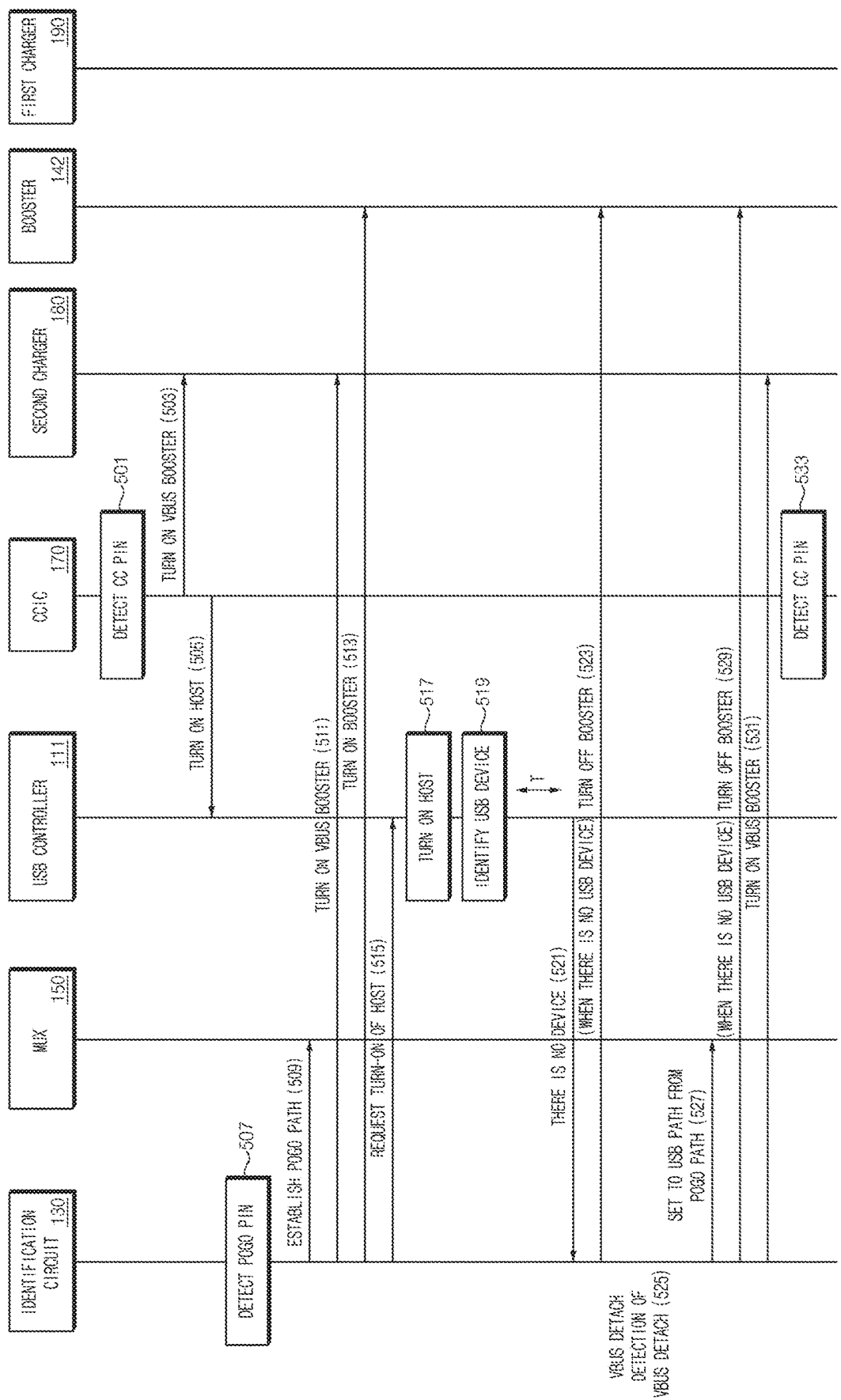
FIG. 5 is a flowchart of a method for connecting to an external device in an electronic device according to an embodiment.

FIG. 5 is a flowchart of a method for connecting to an external device in an electronic device according to an embodiment.

Operations shown in FIG. 5 may be performed by an electronic device (e.g., the electronic device 100 of FIG. 2). At least some of the operations may be performed by a processor (e.g., the processor 110 of FIG. 1 or 2) and stored in a memory in the form of instructions. For example, the matters described as the operations of the identification circuit 130 and the USB controller 111 may be performed in a program (e.g., a circuit driver) included in the processor or the memory.

In the following embodiments, an external device (e.g., the external device 200 of FIG. 3) connected to a first input/output interface (e.g., the first input/output interface 140 of FIG. 2) may be referred to as a first external device and an external device connected to a second input/output interface (e.g., the second input/output interface 160 of FIG. 2) may be referred to as a second external device.

According to an embodiment, when the electronic device recognizes the first external device while performing data communication with the second external device, the electronic device may perform an operation associated with the first external device in preference to the second external device. In other words, the first external device may have a priority over the second external device.

In operation 501, the electronic device may detect a connection with a second external device. The electronic device may detect that the second external device is connected to the CC pin of the second input/output interface through the CCIC 170 (e.g., the connection establishment circuit 170 of FIG. 2). The USB specification may be referred to for operations associated with the second external device.

In operation 503, the electronic device may turn on a booster function. The processor, the USB controller 111, and/or the CCIC 170 may control the second charger 180 to turn on a power booster function. The power supply may be a VBUS power supply. This operation may correspond to turning on the VBUS booster function.

In operation 505, the electronic device may activate USB host operations. For example, the electronic device may activate the USB controller 111 or the USB host operations through the CCIC 170. For example, the CCIC 170 may turn on the USB controller 111 or turn on the USB host function. The USB controller 111 may include a component that performs the USB host function. The electronic device may perform a USB connection with the second external device and be in a USB connection state with the second external device, and the data path may be in a state of being connected to the second data path.

In operation 507, the electronic device may recognize an ID of the first external device through the identification circuit 130. For example, the ID of the first external device may be a pogo ID.

When the ID of the first external device is recognized, the electronic device (e.g., the processor or the USB controller 111) may disconnect from the second external device and perform the connection with the first external device. To this end, the identification circuit 130 may transfer the ID of the first external device to the processor or the USB controller 111.

In operation 509, the electronic device (e.g., the processor, the USB controller 111, and/or the identification circuit 130) may switch a data path in response to the recognition of the ID. For example, when the multiplexer 150 (e.g., the multiplexer 150 of FIG. 2) recognizes the ID while being connected to the second data path, the electronic device may perform control to connect the multiplexer 150 to the first data path.

In operation 511, the electronic device (e.g., the processor, the USB controller 111, and/or the identification circuit 130) may turn off a booster function. The power supply may be a VBUS power supply. This operation may be referred to as turning off the VBUS booster.

In operation 513, the electronic device (e.g., the processor, the USB controller 111, and/or the identification circuit 130) may turn on some functions of the booster 142. The electronic device (e.g., the processor 110) may transmit a message to the booster 142 and turn on the booster function. This operation may be referred to as turning on the pogo booster.

In operation 515, the electronic device (e.g., the identification circuit 130) may request turn-on of a host from the processor 110. For example, the identification circuit 130 may transmit a host turn-on request message to the processor 110. The identification circuit 130 may transmit the host turn-on request message to the USB controller 111.

In operation 517, the electronic device (e.g., the processor or the USB controller 111) may turn on the host function. It may be noted that, in operation 507, the host may already be turned on.

In operation 519, the electronic device (e.g., the processor or the USB controller 111) may identify a first external device. The electronic device may additionally determine whether a first external device is recognized through the first input/output interface (a data pin). The USB controller 111 may determine whether a first external device is recognized within a predetermined time 'T' from a specific time point.

In operation 521, when the first external device is not recognized within the predetermined time (e.g., when foreign matter such as water or dust exists on the input/output interface), the electronic device (e.g., the processor or the USB controller 111) may inform the identification circuit 130 that there is no first external device. The electronic device (e.g., the processor) may transmit a message indicating that there is no first external device to the identification circuit 130.

In operation 523, the electronic device (e.g., the processor, the USB controller 111, or the identification circuit 130) may identify that there is no external device and turn off the booster function. To prevent corrosion of the pogo pin, an electronic device (e.g., a processor) may turn off the VBUS function of the booster 142. When the identification circuit 130 or the booster 142 recognizes that the first external device exists, the connection with the first external device may be performed.

Operations subsequent to operation 525 may represent operations of the electronic device when the connection between the first external device and the electronic device is cut off while the first external device is being connected to the electronic device.

In operation 525, the electronic device (e.g., the processor, the USB controller 111, or the identification circuit 130) may detect the detachment of the ID of the first external device. For example, when the identification circuit 130 detects the detachment of the ID, the identification circuit 130 may inform the processor of the detachment of the ID.

In operation 527, the electronic device (e.g., the processor, the USB controller 111, or the identification circuit 130) may switch a data path to a default path in response to the detachment of the ID. The default path may be, for example, a second data path. The electronic device may set a data path connected to the multiplexer 150 to the second data path. The electronic device may control the multiplexer 150 for the connection to the second data path.

In operation 529, the electronic device (e.g., the processor, the USB controller 111, or the identification circuit 130) may turn off the power supply of the booster 142. The booster 142 may turn off a VBUS.

In operation 531, the electronic device (e.g., the processor, the USB controller 111, or the identification circuit 130) may turn on a VBUS booster function. The electronic device may turn on the VBUS booster function through the second charger 180.

In operation 533, the electronic device may perform detection of a CC pin. For example, the CCIC 170 may perform detection of a CC pin. The USB specification may be referred to for operations related to the detection and connection of the CC pin. Thereafter, the electronic device may again perform connection with the second external device.

Figure 6:
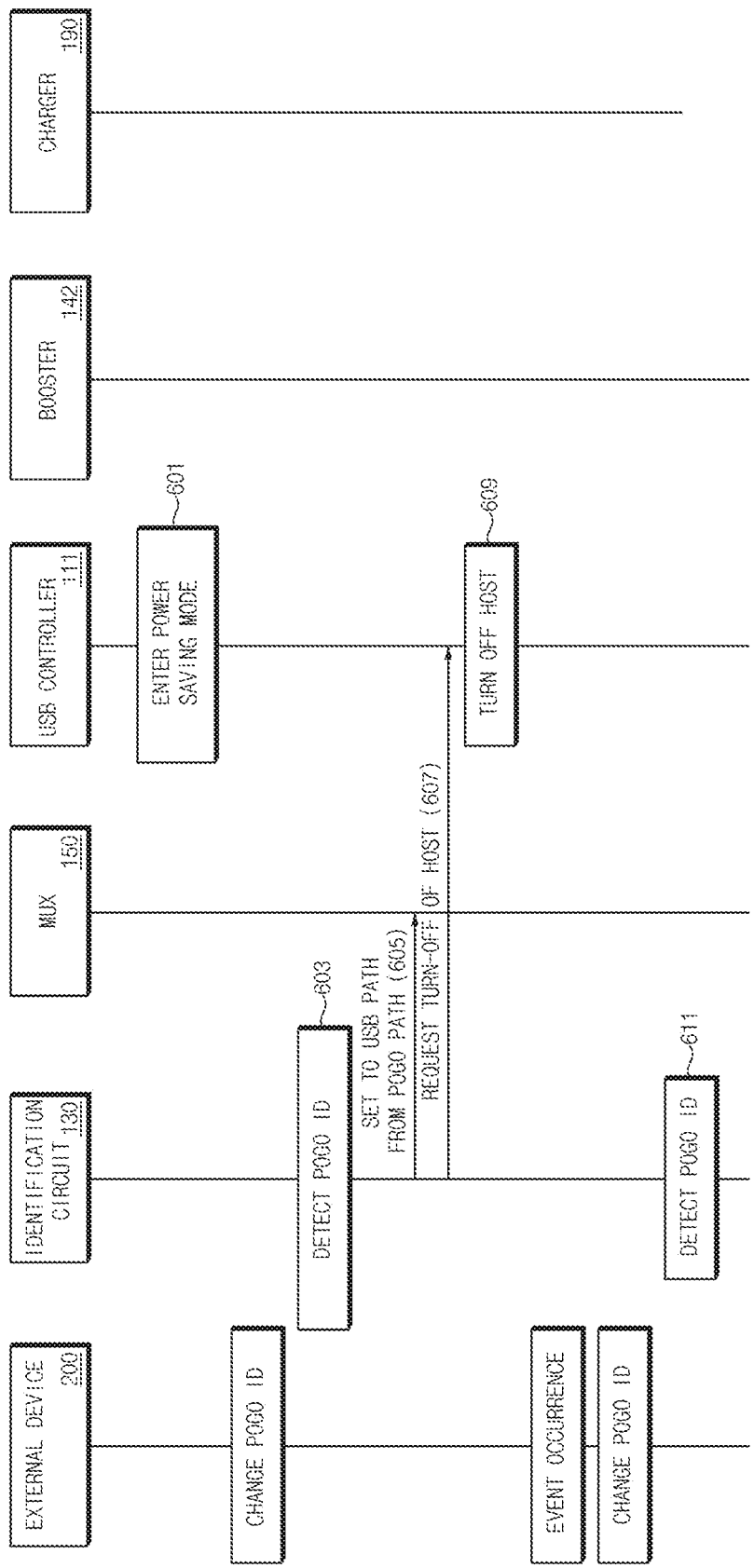
FIG. 6 is a flowchart of a method by which an electronic device enters a power saving mode while connecting to an external device, according to an embodiment.

FIG. 6 is a flowchart of a method by which an electronic device enters a power saving mode while connecting to an external device, according to an embodiment.

Operations shown in FIG. 6 may be performed by an electronic device (e.g., the electronic device 100 of FIG. 1 or FIG. 2). At least some of the operations may be performed by a processor (e.g., the processor 110 of FIG. 1 or 2) and stored in a memory in the form of instructions. In the following embodiments, the external device 200 may be referred to as the external device 200 (e.g., the external device 200 of FIG. 3) connected to a first input/output interface (e.g., the first input/output interface 140 of FIG. 2). The external device 200 may also be referred to as a pogo USB device.

When performing operations according to the USB specification, a large amount of power consumption may occur in the electronic device. In the following embodiments, when the electronic device does not need to use a large amount of power while connecting to the external device, the electronic device may enter the power saving mode.

To describe the following operations, it is assumed that the electronic device recognizes the external device 200 and connects to the external device 200. For example, the matters described as the operations of the identification circuit 130 and the USB controller 111 may be performed in a program (e.g., a circuit driver) included in the processor or the memory.

In operation 601, the electronic device (e.g., the processor or the USB controller 111) may enter the power saving mode. The electronic device may monitor data communication and determine whether to enter the power saving mode.

According to an embodiment, the electronic device may determine whether there is a packet exchange with an external device (e.g., the electronic device 100 of FIG. 3) for a predetermined time. When there is no packet exchange with an external device for the predetermined time, the electronic device may enter the power saving mode. The packet may be, for example, a start of frame (SOF) packet.

According to an embodiment, the power saving mode may be an L1 or L2 mode. Hereinafter, the power saving mode will be exemplified as the L2 mode. When there is no SOF packet for a predetermined time, the electronic device may recognize that the communication connection with the external device is in an inactive state and enter the L2 mode. According to an embodiment, the electronic device may identify entry to the power saving mode and transmit a message related to the power saving mode to the external device 200. The power saving mode will be described later.

In operation 603, the electronic device (the processor, the USB controller 111, or the identification circuit 130) may identify a change in the ID of the external device 200 during data communication with the external device 200. For example, the electronic device may detect an ID (e.g., a second resistance value) having a different value from the ID (e.g., a first resistance value) detected in operation 601, through the identification circuit 130. The change in the ID may correspond to a change in a resistance value connected to a pogo ID pin of the first input/output interface (e.g., the first input/output interface 140 of FIG. 1). According to an embodiment, the external device 200 may change the ID in response to a message associated with the power saving mode of the electronic device.

In operation 605, when identifying the change in the ID of the external device 200 (or detects that the pogo ID is removed from the external device), the electronic device (e.g., the processor, the USB controller 111, or the identification circuit 130) may switch a data path. For example, the processor may identify the change in the ID through the identification circuit 130 and switch a path for data communication to a second data path. The multiplexer 150 may be set to select the second data path. According to various embodiments, operation 605 may be omitted.

In operation 607, the electronic device (e.g., the processor, the USB controller 111, or the identification circuit 130) may turn off the USB host function. The electronic device may control the USB controller 111 to turn off the host function of the USB controller 111. For example, the identification circuit 130 may transmit a host turn off request message to the USB controller 111.

In operation 609, the electronic device (e.g., the processor or the USB controller 111) may turn off the host operation. The USB controller 111 may turn off the host operation in response to the host turn off message. The USB controller 111 may include a host block that performs a host function and turn off the host block.

According to various embodiments, the electronic device may maintain a turned-on state without turning off the VBUS function of the booster 142 in consideration of subsequent reconnection with the external device 200 even when turning off the host block. The booster 142 may continuously supply VBUS power to the external device 200. In this case, according to various embodiments, the amount of power of the VBUS supplied from the booster 142 may be less than the amount of power in a state of being connected to the external device 200 for communication. In other words, when the host function is turned off, the electronic device may reduce the amount of power transferred to the VBUS.

According to an embodiment, when a specific event (e.g., a user input event through the input device 270 of FIG. 3) occurs, the external device 200 may change the ID of the external device 200 in response to the specific event. For example, the ID of the external device 200 may be restored to an ID before the change.

In operation 611, the electronic device (e.g., the processor, the USB controller 111, and/or the identification circuit 130) may detect the restored ID. For example, the electronic device may detect that the resistance at the identification pin of the input/output interface 140 has been changed from a second resistance value to a first resistance value through the identification circuit 130. The electronic device may perform reconnection with the external device 200 in response to the detection of the restored ID. For example, the electronic device may perform a connection operation with the external device shown in FIG. 4. In this case, according to various embodiments, operation 405 may not be performed because the VBUS function of the booster 142 is turned on. The electronic device may increase the amount of VBUS power.

Depending on cases, the electronic device may turn off the VBUS function of the booster 142 in the power saving mode. In this case, when the electronic device reconnects to the external device 200, the electronic device may perform operation 405.

Figure 7:
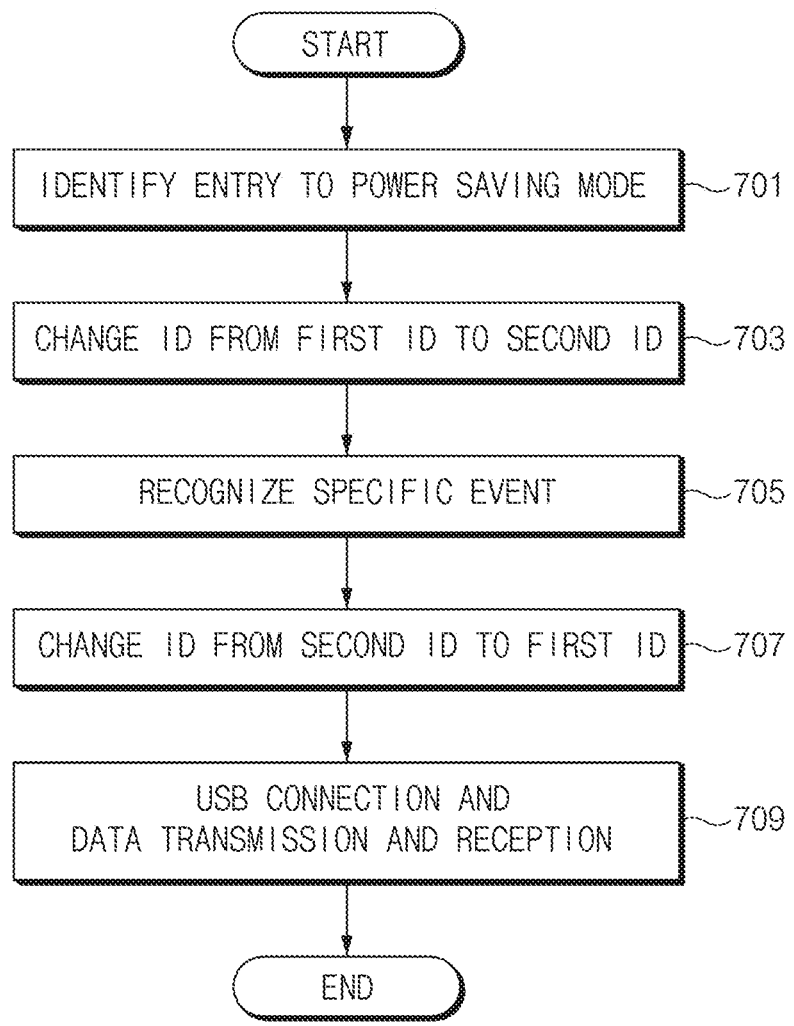
FIG. 7 is a schematic flowchart of a power saving method of an electronic device according to an embodiment.

FIG. 7 is a schematic flowchart of a power saving method of an electronic device according to an embodiment.

Operations shown in FIG. 7 may be performed by an electronic device (e.g., the electronic device 200 of FIG. 3). At least some of the operations may be performed by a processor (e.g., the processor 210 of FIG. 3) and stored in a memory in the form of instructions. In the following embodiments, an external device connected to an input/output interface (e.g., the first input/output interface 140 of FIG. 2) of the electronic device may be the electronic device 100 of FIG. 1 or 2. The electronic device may be, for example, a pogo USB device, and may correspond to the external device (e.g., the external device 200 of FIG. 6) of FIGS. 4 to 6.

In operation 701, the electronic device may identify that the external device has entered a power saving mode. The electronic device may acquire a message associated with the power saving mode from the external device.

In operation 703, the electronic device may change an ID of the electronic device. The electronic device may change the ID from a first ID to a second ID. In other words, a resistance value of the electronic device at a pogo pin of the external device may be changed from a first value to a second value. The ID may be a pogo ID. The electronic device may change the ID in response to the message associated with the power saving mode.

In operation 705, the electronic device may recognize a specific event for reconnection with the external device. The specific event may be, for example, occurrence of a user input to the electronic device or a change in the state of the electronic device.

According to an embodiment, the electronic device may receive power from an external device even in the power saving mode to detect the specific event. The input/output interface (e.g., the input/output interface 240 of FIG. 3) of the electronic device may include a power pin for receiving the power. To this end, in the external device, a power supply of the booster 142 may be in a turned-on state.

Alternatively, the electronic device may further include a circuit capable of supplying power, such as a super cap or a small battery, or may be in a state of being TA connected to an external device. In this case, the electronic device and the external device may detect a specific event and perform a relevant operation even when supply of the VBUS power is cut off.

In operation 707, the electronic device may change the ID in response to the specific event. For example, the electronic device may change the ID from the second ID to the first ID. The specific event may be, for example, acquisition of a user input. The electronic device may be, for example, a keyboard connected to the electronic device through a pogo pin and supporting USB communication. In this case, when the user input is acquired through the keyboard, the electronic device may change the ID.

In operation 709, the electronic device may again perform connection with the external device, and transmit data to or receive data from the external device. Due to the change of the ID, the connection with the external device may be triggered.

Figure 8:
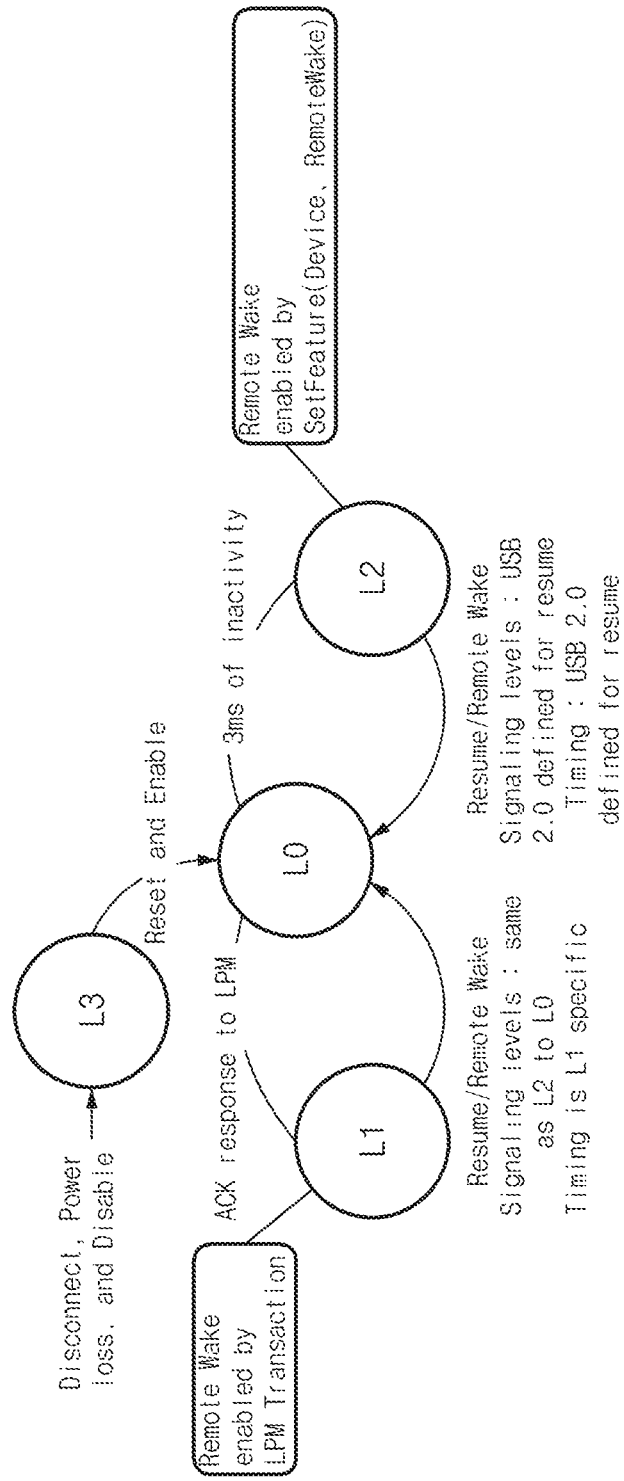
FIG. 8 illustrates a change in a link power management (LPM) state of an electronic device according to an embodiment.

FIG. 8 illustrates a change in a link power management (LPM) state of a USB controller according to an embodiment.

According to an embodiment, the electronic device (e.g., the electronic device 100 of FIG. 1 or 2 or the electronic device 200 of FIG. 3) may operate in various states. For example, a USB controller (e.g., the USB controller 111 of FIG. 1) may be in one of L0 to L3 states.

L0 may be in a state of being connected to an external device. When the electronic device in the L0 state acquires an ACK response to the LPM, the electronic device may transition to the L1 state. When the electronic device in the L0 state is in an inactive state for a predetermined time (e.g., 3 ms), the electronic device may transition to the L2 state.

L3 may be a state of being disconnected from the external device. The electronic device in the L3 state may transition to the L1 state by reset and enable. The USB-related specification may be referred to for details of operations in L0 to L3.

Referring back to FIG. 8, when there is no packet exchange for a predetermined time, the electronic device may enter the L2 state, and set a resume signal to enter the L0 mode from the L2 mode.

Figure 9:
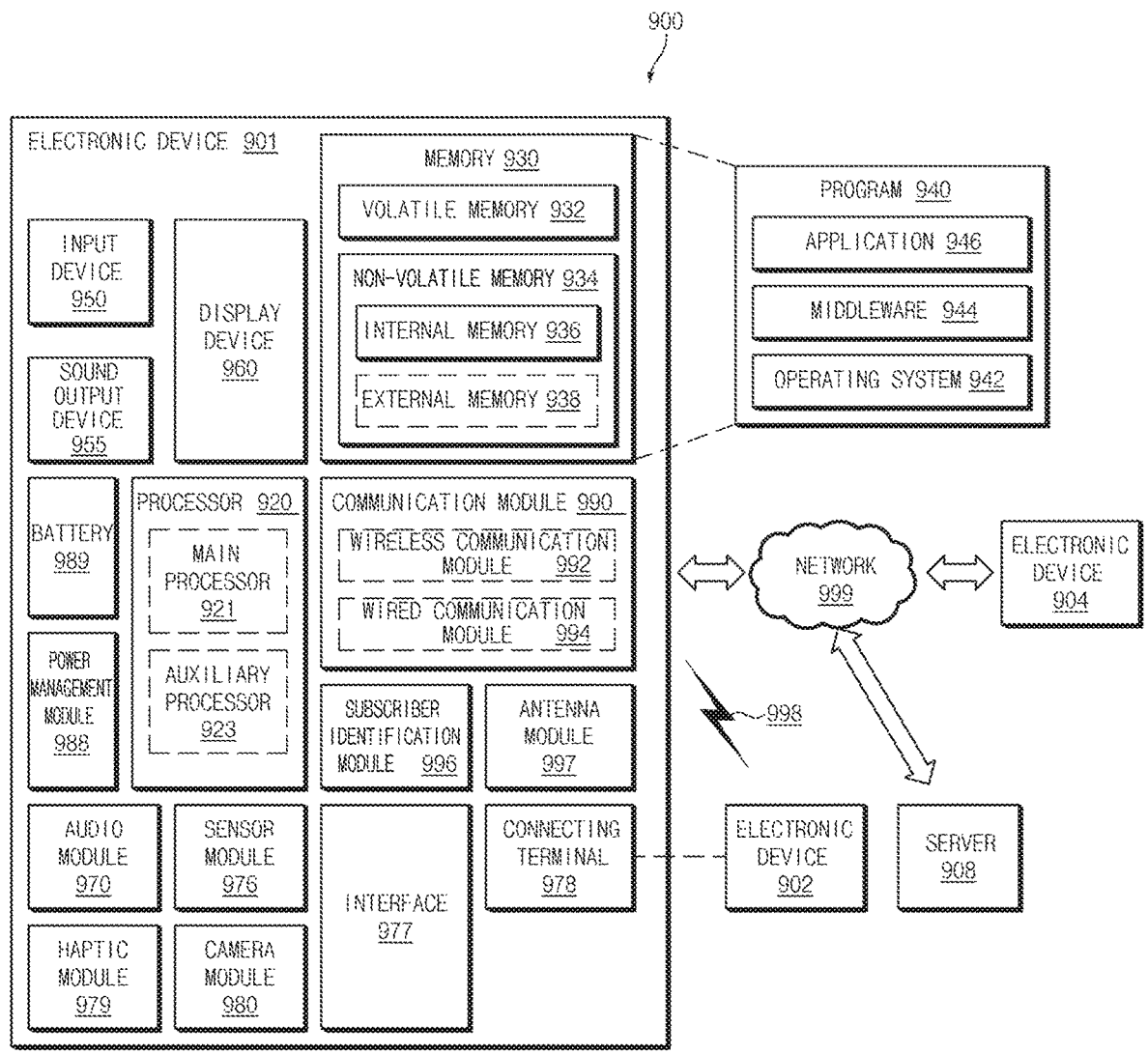
FIG. 9 is a block diagram of an electronic device in a network environment according to various embodiments.

FIG. 9 is a block diagram of an electronic device 901 in a network environment 900 according to various embodiments.

Referring to FIG. 9, an electronic device 901 may communicate with an electronic device 902 through a first network 998 (e.g., a short-range wireless communication) or may communicate with an electronic device 904 or a server 908 through a second network 999 (e.g., a long-distance wireless communication) in a network environment 900. According to an embodiment, the electronic device 901 may communicate with the electronic device 904 through the server 908. According to an embodiment, the electronic device 901 may include a processor 920, a memory 930, an input device 950, a sound output device 955, a display device 960, an audio module 970, a sensor module 976, an interface 977, a haptic module 979, a camera module 980, a power management module 988, a battery 989, a communication module 990, a subscriber identification module 996, and an antenna module 997. According to some embodiments, at least one (e.g., the display device 960 or the camera module 980) among components of the electronic device 901 may be omitted or other components may be added to the electronic device 901. According to some embodiments, some components may be integrated and implemented as in the case of the sensor module 976 (e.g., a fingerprint sensor, an iris sensor, or an illuminance sensor) embedded in the display device 960 (e.g., a display).

The processor 920 may operate, for example, software (e.g., a program 940) to control at least one of other components (e.g., a hardware or software component) of the electronic device 901 connected to the processor 920 and may process and compute a variety of data. The processor 920 may load a command set or data, which is received from other components (e.g., the sensor module 976 or the communication module 990), into a volatile memory 932, may process the loaded command or data, and may store result data into a nonvolatile memory 934. According to an embodiment, the processor 920 may include a main processor 921 (e.g., a central processing unit or an application processor) and an auxiliary processor 923 (e.g., a graphic processing device, an image signal processor, a sensor hub processor, or a communication processor), which operates independently from the main processor 921, additionally or alternatively uses less power than the main processor 921, or is specified to a designated function. In this case, the auxiliary processor 923 may operate separately from the main processor 921 or embedded.

In this case, the auxiliary processor 923 may control, for example, at least some of functions or states associated with at least one component (e.g., the display device 960, the sensor module 976, or the communication module 990) among the components of the electronic device 901 instead of the main processor 921 while the main processor 921 is in an inactive (e.g., sleep) state or together with the main processor 921 while the main processor 921 is in an active (e.g., an application execution) state. According to an embodiment, the auxiliary processor 923 (e.g., the image signal processor or the communication processor) may be implemented as a part of another component (e.g., the camera module 980 or the communication module 990) that is functionally related to the auxiliary processor 923. The memory 930 may store a variety of data used by at least one component (e.g., the processor 920 or the sensor module 976) of the electronic device 901, for example, software (e.g., the program 940) and input data or output data with respect to commands associated with the software. The memory 930 may include the volatile memory 932 or the nonvolatile memory 934.

The program 940 may be stored in the memory 930 as software and may include, for example, an operating system 942, a middleware 944, or an application 946.

The input device 950 may be a device for receiving a command or data, which is used for a component (e.g., the processor 920) of the electronic device 901, from an outside (e.g., a user) of the electronic device 901 and may include, for example, a microphone, a mouse, or a keyboard.

The sound output device 955 may be a device for outputting a sound signal to the outside of the electronic device 901 and may include, for example, a speaker used for general purposes, such as multimedia play or recordings play, and a receiver used only for receiving calls. According to an embodiment, the receiver and the speaker may be either integrally or separately implemented.

The display device 960 may be a device for visually presenting information to the user of the electronic device 901 and may include, for example, a display, a hologram device, or a projector and a control circuit for controlling a corresponding device. According to an embodiment, the display device 960 may include a touch circuitry or a pressure sensor for measuring an intensity of pressure on the touch.

The audio module 970 may convert a sound and an electrical signal in dual directions. According to an embodiment, the audio module 970 may obtain the sound through the input device 950 or may output the sound through an external electronic device (e.g., the electronic device 902 (e.g., a speaker or a headphone)) wired or wirelessly connected to the sound output device 955 or the electronic device 901.

The sensor module 976 may generate an electrical signal or a data value corresponding to an operating state (e.g., power or temperature) inside or an environmental state outside the electronic device 901. The sensor module 976 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 977 may support a designated protocol wired or wirelessly connected to the external electronic device (e.g., the electronic device 902). According to an embodiment, the interface 977 may include, for example, an HDMI (high-definition multimedia interface), a USB (universal serial bus) interface, an SD card interface, or an audio interface.

A connecting terminal 978 may include a connector that physically connects the electronic device 901 to the external electronic device (e.g., the electronic device 902), for example, an HDMI connector, a USB connector, an SD card connector, or an audio connector (e.g., a headphone connector).

The haptic module 979 may convert an electrical signal to a mechanical stimulation (e.g., vibration or movement) or an electrical stimulation perceived by the user through tactile or kinesthetic sensations. The haptic module 979 may include, for example, a motor, a piezoelectric element, or an electric stimulator.

The camera module 980 may shoot a still image or a video image. According to an embodiment, the camera module 980 may include, for example, at least one lens, an image sensor, an image signal processor, or a flash.

The power management module 988 may be a module for managing power supplied to the electronic device 901 and may serve as at least a part of a power management integrated circuit (PMIC).

The battery 989 may be a device for supplying power to at least one component of the electronic device 901 and may include, for example, a non-rechargeable (primary) battery, a rechargeable (secondary) battery, or a fuel cell.

The communication module 990 may establish a wired or wireless communication channel between the electronic device 901 and the external electronic device (e.g., the electronic device 902, the electronic device 904, or the server 908) and support communication execution through the established communication channel. The communication module 990 may include at least one communication processor operating independently from the processor 920 (e.g., the application processor) and supporting the wired communication or the wireless communication. According to an embodiment, the communication module 990 may include a wireless communication module 992 (e.g., a cellular communication module, a short-range wireless communication module, or a GNSS (global navigation satellite system) communication module) or a wired communication module 994 (e.g., an LAN (local area network) communication module or a power line communication module) and may communicate with the external electronic device using a corresponding communication module among them through the first network 998 (e.g., the short-range communication network such as a Bluetooth, a WiFi direct, or an IrDA (infrared data association)) or the second network 999 (e.g., the long-distance wireless communication network such as a cellular network, an internet, or a computer network (e.g., LAN or WAN)). The above-mentioned various communication modules 990 may be implemented into one chip or into separate chips, respectively.

According to an embodiment, the wireless communication module 992 may identify and authenticate the electronic device 901 using user information stored in the subscriber identification module 996 in the communication network.

The antenna module 997 may include one or more antennas to transmit or receive the signal or power to or from an external source. According to an embodiment, the communication module 990 (e.g., the wireless communication module 992) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 901 and the external electronic device 904 through the server 908 connected to the second network 999. Each of the electronic devices 902 and 904 may be the same or different types as or from the electronic device 901. According to an embodiment, all or some of the operations performed by the electronic device 901 may be performed by another electronic device or a plurality of external electronic devices. When the electronic device 901 performs some functions or services automatically or by request, the electronic device 901 may request the external electronic device to perform at least some of the functions related to the functions or services, in addition to or instead of performing the functions or services by itself. The external electronic device receiving the request may carry out the requested function or the additional function and transmit the result to the electronic device 901. The electronic device 901 may provide the requested functions or services based on the received result as is or after additionally processing the received result. To this end, for example, a cloud computing, distributed computing, or client-server computing technology may be used.

The electronic device according to various embodiments disclosed in the present disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the present disclosure should not be limited to the above-mentioned devices.

It should be understood that various embodiments of the present disclosure and terms used in the embodiments do not intend to limit technologies disclosed in the present disclosure to the particular forms disclosed herein; rather, the present disclosure should be construed to cover various modifications, equivalents, and/or alternatives of embodiments of the present disclosure. With regard to description of drawings, similar components may be assigned with similar reference numerals. As used herein, singular forms may include plural forms as well unless the context clearly indicates otherwise. In the present disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the present disclosure may be implemented by software (e.g., the program 940) including an instruction stored in a machine-readable storage media (e.g., an internal memory 936 or an external memory 938) readable by a machine (e.g., a computer). The machine may be a device that calls the instruction from the machine-readable storage media and operates depending on the called instruction and may include the electronic device (e.g., the electronic device 901). When the instruction is executed by the processor (e.g., the processor 920), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. An electronic device comprising:
a housing;
an input/output interface including a plurality of pogo pins exposed through a portion of the housing and connectable to an external device in a wired manner;
an identification circuit electrically connected to the input/output interface to identify the external device;
a processor electrically connected to the identification circuit; and
a booster electrically connected to the input/output interface to supply power to the external device,
wherein the plurality of pogo pins includes:
at least one first pin for data communication with the external device;
a second pin electrically connected to the identification circuit to transfer an ID of the electronic device;
a third pin electrically connected to the booster; and
a fourth pin electrically connected to a ground of the electronic device,
wherein the third pin is configured to supply or receive VBUS, and
wherein the processor is configured to:
after the VBUS being turned on, determine whether the external device is recognized within a first time interval through the input/output interface, and
when the external device is not recognized within the first time interval, control the booster to turn off the VBUS.

2. The electronic device of claim 1, further comprising:
a user serial bus (USB) controller,
wherein the input/output interface is electrically connected to the USB controller.

3. The electronic device of claim 1, wherein the processor or the identification circuit is configured to trigger communication connection with the external device based at least on the second pin.

4. The electronic device of claim 3, wherein the identification circuit is configured to allow the booster to supply power through the third pin when acquiring an ID of the external device through the second pin.

5. The electronic device of claim 4, wherein the processor is configured to:
monitor data communicated through the at least one first pin for a second time interval, and
stop an operation of supplying the power when the data is not communicated within the second time interval.

6. The electronic device of claim 5, wherein the second time interval is a time interval after the ID of the external device is acquired.

7. The electronic device of claim 4, wherein the ID has a resistance value.

8. The electronic device of claim 1, wherein the identification circuit is configured to detect a change in an ID of the external device while communicating data with the external device.

9. The electronic device of claim 8, wherein the processor or the identification circuit is configured to stop communication of the data in response to the change in the ID.

10. The electronic device of claim 8, wherein the processor or the identification circuit is configured to allow the booster to stop an operation of supplying power in response to the change of the ID.

11. The electronic device of claim 1, further comprising:
at least one charger electrically connected to the input/output interface; and
a battery electrically connected to the charger.

12. The electronic device of claim 1, wherein the input/output interface further includes:
a fifth pin electrically connected to a charger, and
wherein the input/output interface is configured to acquire power from the external device through the fifth pin.

13. The electronic device of claim 1, wherein the input/output interface is configured to support a travel adapter (TA).

14. An electronic device comprising:
a housing;
a standard type of first user serial bus (USB) input/output interface exposed through a first portion of the housing;
a non-standard type of second USB input/output interface including a plurality of pogo pins exposed through a second portion of the housing;
a selection circuit configured to select the first USB input/output interface or the second USB input/output interface;
an identification circuit electrically connected to the selection circuit to identify an external device;
a processor electrically connected to the identification circuit;
at least one charger electrically connected to at least one of the first USB input/output interface or the second USB input/output interface; and
a battery electrically connected to the charger,
wherein the plurality of pogo pins includes:
at least one first pin electrically connected to the selection circuit to communicate data with the external device, a second pin electrically connected to the identification circuit by bypassing the selection circuit,
a third pin electrically connected to the battery, and
a fourth pin electrically connected to a ground of the electronic device,
wherein the third pin is configured to supply or receive VBUS, and
wherein the processor is configured to:
after the VBUS being turned on, determine whether the external device is recognized within of a predetermined time through the input/output interface, and
when the external device is not recognized within the predetermined time, control a booster to turn off the VBUS.

15. The electronic device of claim 14, wherein the plurality of pogo pins further includes a fifth pin electrically connected to the charger.

16. The electronic device of claim 15, wherein the processor is configured to provide power to the external device through the fourth pin or acquire power from the external device through the fifth pin when the external device is connected to the second USB input/output interface.

17. The electronic device of claim 14, wherein the selection circuit includes a multiplexer.

18. The electronic device of claim 17, wherein the processor or the identification circuit is configured to:
when the external device is connected to the first USB input/output interface and another external device is connected to the second USB input/output interface, allow the multiplexer to communicate data between the multiplexer and the second USB input/output interface and not to communicate data between the multiplexer and the first USB input/output interface.

19. The electronic device of claim 14, further comprising:
a user serial bus (USB) controller,
wherein the USB controller is configured to generate a signal at least associated with the second USB input/output interface.

20. The electronic device of claim 19, wherein the USB controller is configured to generate a signal associated with the first USB input/output interface.

* * * * *